UNITED STATES PATENT OFFICE.

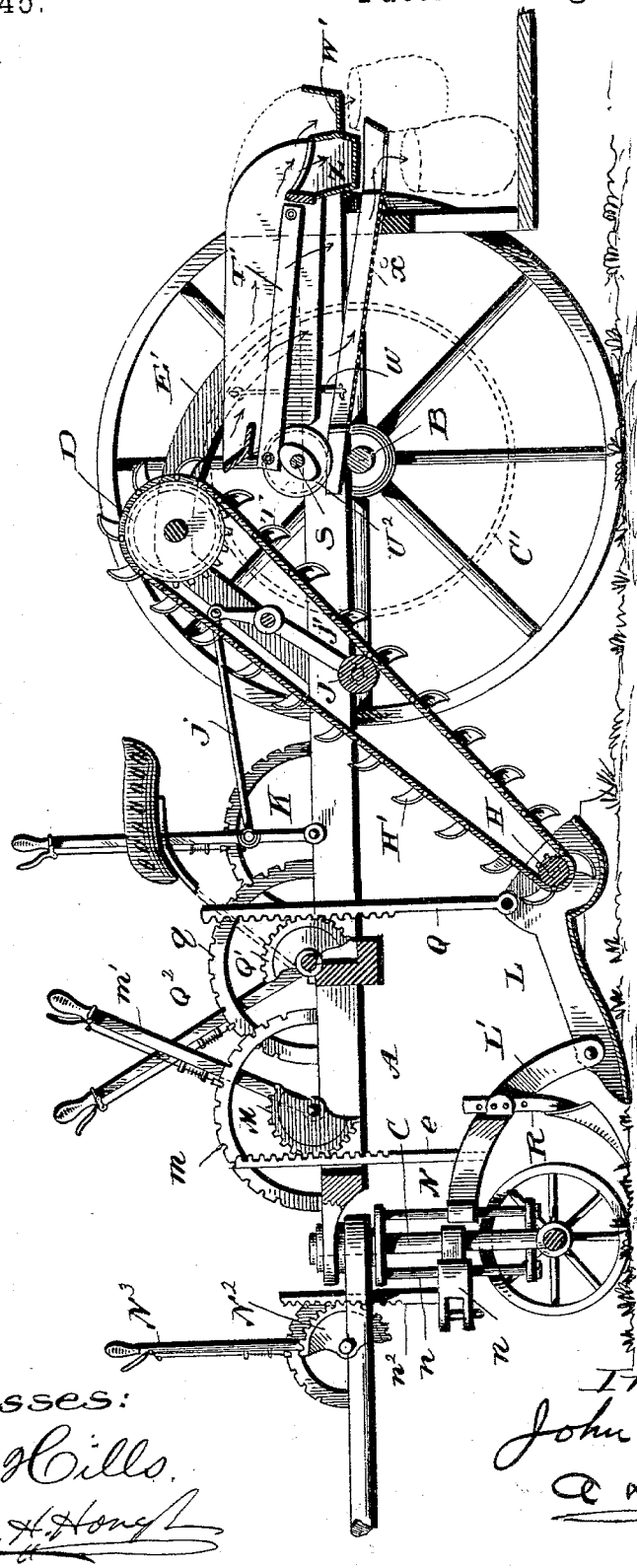

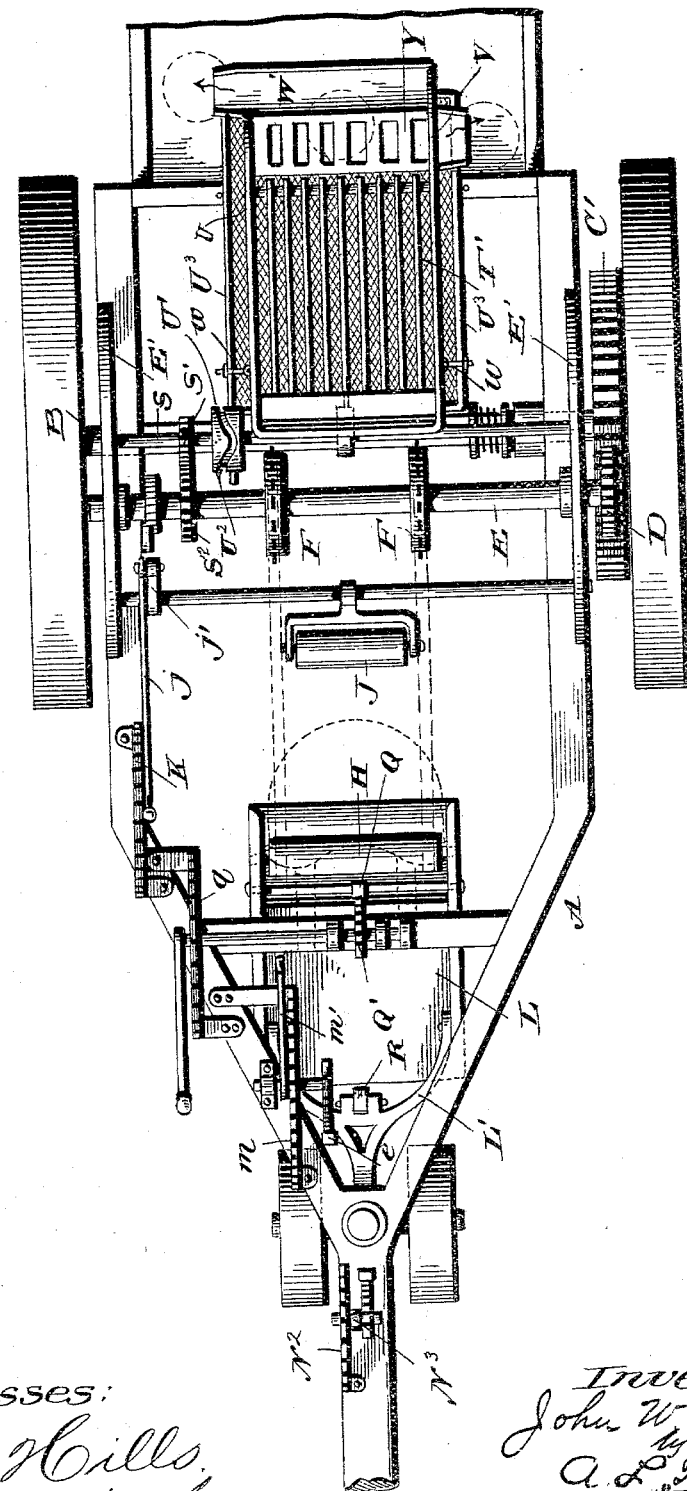

JOHN W. WOODS, OF MERRIAM, KANSAS.

POTATO-DIGGER.

SPECIFICATION forming part of Letters Patent No. 545,145, dated August 27, 1895.

Application filed April 1, 1895. Serial No. 544,023. (No model.)

*To all whom it may concern:*

Be it known that I, JOHN W. WOODS, a citizen of the United States, residing at Merriam, in the county of Johnson and State of Kansas, have invented certain new and useful Improvements in Potato-Diggers; and I do hereby declare the following to be a full, clear, and exact description of the invention, such as will enable others skilled in the art to which it appertains to make and use the same, reference being being had to the accompanying drawings, and to the letters of reference marked thereon, which form a part of this specification.

This invention relates to certain new and useful improvements in potato-diggers in which provision is made for elevating the soil, together with the potatoes, by means of an endless belt carrying scoops which convey the potatoes to assorting-platforms, where the various-sized potatoes are caused to roll into different bags or receptacles, the soil being allowed to fall to the ground through suitable screens.

The invention consists, further, in the construction of a potato-digger having the shovel which is designed to scoop up the earth with the potatoes adjustable at both its front and rear ends, so that the depth to which it is desired to dig the row may be easily and quickly adjusted by hand-levers within easy reach of the operator of the machine.

In my improved machine I make provision for taking up any slack in the endless conveyer by means of an idler connected to a lever within easy reach of the seat. The screens which I employ to receive and absorb the potatoes are of various sizes of mesh, and are given both a vertical and a side reciprocating movement for the purpose of thoroughly separating the smaller potatoes from the larger ones and to free the potatoes of all foreign substances, these reciprocating movements being produced by cams operated by gearing on the main driving-wheels, which will be hereinafter more fully described.

To these ends and to such others as the invention may pertain the same consists essentially in the novel construction, combination, and adaptation of the parts, as will be hereinafter more fully described, and then specifically defined in the appended claims.

I clearly illustrate my invention in the accompanying drawings, which, with the letters of reference marked thereon, form a part of this specification, and in which drawings similar letters of reference indicate like parts throughout both views, in which—

Figure 1 is a central vertical sectional view of my potato-digger. Fig. 2 is a top plan view, certain parts of the machine not being shown to better illustrate the invention.

Reference now being had to the details of the drawings by letter, A designates the main framework, which is mounted on the rear shaft B, the forward end being held to the swiveled cleaves-carrying portion C. The rear wheels of my digger are employed to impart motion to the elevating mechanism by having a geared rim fastened to the spokes of one of the wheels, with the teeth of which rim there meshes a cogged wheel D, keyed to the end of a shaft E, which is journaled in bearings carried on standards E'. On the said shaft E are keyed the sprocket-wheels F, and about these sprocket-wheels the endless chain or belt G passes at it highest point, and at its lowest limit the said chain passes about the sprocket-wheels H.

I regulate the tension of the endless chain carrying the buckets H' by means of the idler or tightener J, journaled on the lever J', which latter has connection, by means of the rod $j$, with a hand-lever $j'$, whose lower end is pivoted to the main frame of the machine and provided with suitable releasing lever and segment K. The shovel L is adjustable at both ends—at the front end by means of the curved bar L', pivoted to the forward end of the shovel, the said curved bar having the rack $l$ secured near its longitudinal center, the teeth on which rack are adapted to mesh with those of the segment M held to the handle M', which lever has its suitable releasing dog and segment $m$. The forward end of the said bar L' is perforated, and travels up and down on the bar N, the clevis $n$ working up and down on the rod $n'$ by means of the rack $n^2$, meshing with the segment $N^2$, to which is secured the lever $N^3$, fastened to the pole of the machine. The rear end of the scoop is pivoted to the rack-bar Q, which meshes with the segment Q' on the lever $Q^2$, which is provided with a dog designed to engage with notches on the segment $q$. Adjustably held to the curved bar L' is the weed-cutter R.

S is a shaft journaled in bearings in the standards E' and has keyed to it a cogged wheel S' meshing with a cogged wheel $S^2$ on the shaft E, from which power is transmitted to the said shaft S carrying the cam-wheel T, which causes a vertical motion to the longitudinal bars T' held to a cross-piece resting upon the said cam. The lower ends of the said longitudinal rods are secured to the rod or shaft U.

U' is a wheel keyed to the shaft S and has an irregular grooved track about its circumference in which a lug on the bar $U^3$ is designed to travel. The said bar $U^3$ has secured to it a pin W, connecting the bar $U^3$ to the side of the shaking-frame containing the assorting-bars, whereby a lateral reciprocating motion is imparted to the assorters. The large potatoes roll down over the longitudinal assorting-bars and into the trough W', the smaller-sized ones passing between the bars T' onto the screen beneath X, the medium-sized potatoes passing through the meshes of the assorter Y, fall into the trough Z, and run down its incline to a bag placed for the reception of the potatoes.

Bags are attached at the various troughs to receive different-sized potatoes, so that the whole work of digging the potatoes and assorting the same is, as will be seen, done automatically, only two persons being required to operate the machine. The machine may be thrown into and out of gear by a simple clutch mechanism secured to the shaft carrying the geared wheel, if it is desired.

Having thus described my invention, what I claim to be new, and desire to secure by Letters Patent, is—

1. In a potato digger, the combination of the endless conveyer mounted on sprocket wheels and carrying a series of buckets, the tightener J, the rod $j$ to the frame carrying said tightener and lever $j'$ and segment K, of the scoop L, the rack bar Q pivoted to its rear end, the geared segment Q' of the handle lever $Q^2$ and segment $q$, the curved member L' having its forward end mounted on the vertical rod N, the rack bar $e$ secured to said member, the geared segment M meshing therewith, and a weed cutter R adjustably held on said member, all substantially as shown and described.

2. In a potato digger, the combination of the conveyer and adjustable scoop mounted as described, of the post C, the vertically adjustable clevis mounted thereon, the rack bar $n^2$ secured thereto, the geared segment $N^2$ and handle $N^3$ for raising and lowering the said clevis, the member L' mounted on the vertical rod N, and means for operating the machine, substantially as shown and described.

3. In combination with the conveyer as described, the series of grate bars mounted on suitable cross bars, the shaft S mounted on the main framework and carrying a cam T, designed to impart a vertical motion to the said grate bars, the irregular grooved wheel U' mounted on shaft S, the rod $U^3$ having a lug designed to travel in said groove, the pin $w$ connecting the said rod $U^3$ to the frame carrying the grate bars, whereby a lateral reciprocating motion is imparted, means for operating the machine, substantially as shown and described.

4. In combination with the series of grate bars vertically and laterally movable, perforated assorting plate Y, the trough W', the shaking screen $w$ and the trough Z, and geared mechanism for operating the machine, substantially as shown and for the purpose set forth.

In testimony whereof I affix my signature in presence of two witnesses.

JOHN W. WOODS.

Witnesses:
 Tom Lowry,
 P. O. Hughes.